United States Patent Office 2,850,466
Patented Sept. 2, 1958

2,850,466

POLYMERIC ALLYLARYLOXYACETIC ACIDS

Gaetano F. D'Alelio, Pittsburgh, Pa., assignor to Koppers Company, Inc., a corporation of Delaware No Drawing. Application October 20, 1954
Serial No. 463,616

8 Claims. (Cl. 260—2.5)

This application is concerned with polymeric allylaryloxyacetic acids. These polymers are useful for a variety of purposes such as, for example, sizings, in the preparation of freeze-proof emulsions and water-redispersible polymers, as polymers for coatings and adhesives and as scavengers in synthetic detergents. Further, the polymers can be cross-linked to produce thermoset resins by curing, for example, with polyisocyanates or polyoxirane compounds which thermoset resins are useful for molding, laminating and the like. It is to be noted that stable cellular compositions can be prepared from polymers of this invention containing hereinafter described proportions of polymeric alkenylaryloxyacetic acids by the reaction with isocyanates which reaction produces carbon dioxide which acts as the expanding agent. Additionally, these resins when cross-linked, for example, by a polyfunctional ethylenically unsaturated agent, exhibit ion-exchange properties.

The invention is particularly concerned with polymeric allylaryloxyacetic acids having a plurality of repeating units of the formula

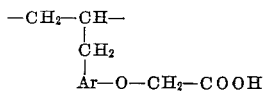

in which Ar is an arylene group.

As used herein the term "polymer" embraces both homopolymers and copolymers. The term "copolymer" as used herein embraces polymeric materials derived from the polymerization of two or more monomeric materials. That is, 2, 3, 4, 5 . . . ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following preferred embodiments:

*Example I*

A cold solution of sodium 4-allylphenolate is prepared from 90 parts 4-allylphenol, 20 parts sodium hydroxide and 350 parts water. This is added over a period of approximatey 1 hour with stirring to a 50 percent solution of sodium bromo-acetate in water at 75° C. Thereafter the mixture is stirred for an additional hour at 85° C. The mixture is acidified with dilute hydrochloric acid to a pH of approximately 2 whereupon there is obtained 4-allylphenoxyacetic acid which is removed by filtration. The acid is recrystallized from carbon tetrachloride.

A 7 percent solution of this acid in dry xylene is prepared and there is added 4 percent benzoyl peroxide based on the acid. The mixture is cooled to the temperature of a Dry Ice bath and the atmosphere alternately evacuated and filled with nitrogen. Polymerization is carried out under an atmosphere of nitrogen at 110° C. for approximately 18 hours. The xylene is removed by vacuum distillation. There is obtained homopolymeric 4-allylphenoxyacetic acid.

Similarly, linear, soluble homopolymers of various alkenylaryloxyacetic acids such as 3-allylphenoxyacetic acid can be obtained following the procedure of Example I.

*Example II*

Seven parts 4-allylphenoxyacetic acid, 63 parts styrene, and 0.5 benzoyl peroxide based on the monomers are dissolved in 1000 parts dry xylene, and polymerization is carried out as described in Example I, except that the heating period is 15 hours at 80° C. There is obtained a solid polymer.

*Example III*

Example II is repeated substituting for the styrene there used a similar quantity of butadiene. There is obtained a copolymer soluble in toluene.

*Example IV*

Example II is repeated substituting for the styrene there used an equal quantity of acrylonitrile. There is obtained a polymer soluble in dimethylformamide.

*Example V*

Example II is repeated substituting for the styrene there used a similar quantity of maleic anhydride. There is obtained a polymer soluble in toluene.

*Example VI*

Example II is repeated substituting for the styrene there used a similar quantity of methyl methacrylate. There is obtained a polymer soluble in toluene.

While the foregoing Examples II to VI illustrate the copolymerization of 4-allylphenoxyacetic acid with various copolymerizable ethylenic monomers, it will be realized that the various allylaryloxyacetic acids can be substituted for the particular compound utilized in those examples to yield coplymers. Further, there can be utilized mixtures of two or more allylaryloxyacetic acids in the preparation of copolymers either alone or in combination with a copolymerizable ethylenic unsaturated monomer, or mixtures of two or more copolymerizable ethylenic unsaturated monomers.

It is to be noted that for benzoyl peroxide utilized in the foregoing examples there can be substituted a variety of peroxy-catalysts such as hydrogen, acetyl, acetyl-benzoyl, phthalyl and lauroyl peroxides, tertiary-butyl hydroperoxides, etc., and other per compounds, for example ammonium sulfate, sodium persulfate, sodium perchlorate and the like.

*Example VII*

One hundred parts of the polymer of Example II is admixed with 10 parts of the diglycidyl ether of bisphenol and 1 percent ethylenediamine and the mixture warmed gently. There is obtained a thermoset resin.

*Example VIII*

Example VII is repeated utilizing in place of the diglycidyl ether of bisphenol an equal weight of the resin described at column 7 of my U. S. Patent 2,658,885, granted Nov. 10, 1953. There is obtained a thermoset resin.

It will be realized that the various epoxyalkoxy hydrocarbon substituted phenol aldehyde resins described in that patent can be utilized in the foregoing procedure. Additionally the epoxyalkoxy chlorine substituted phenol aldehyde resins described in my U. S. Patent 2,658,884, granted Nov. 10, 1953, can be utilized in the foregoing procedure.

It will be realized that in place of the ethylenediamine catalyst utilized in Examples VII and VIII there can be substituted equivalent portions of such amine catalysts as tetrahydroquinoline and piperidine to obtain substantially similar results.

There can be substituted for the polymer utilized in Examples VII and VIII similar quantities of the various polymers of this invention, that is, polymers of allylaryloxyacetic acids.

*Example IX*

Following the procedure of Example II 50 parts 4-allylphenoxyacetic acid and 250 parts styrene are polymerized. There is obtained a solid which is comminuted and admixed with 150 parts 2,4-toluenediisocyanate and placed in a mold having void space for expansion. The mixture is heated rapidly to 110° C. and there is produced a cross-linked cellular polymer.

For the copolymer used in the foregoing procedure there can be substituted copolymers of styrene and allylphenoxyacetic acid in which the styrene/phenoxyacetic acid ratio in parts by weight is from approximately 3:1 to approximately 10:1. Similarly, copolymers of styrene and the other allylarylphenoxyacetic acids described herein can be utilized in which the styrene/aryloxyacetic acid ratio is in approximately the aforedescribed range. Further, other copolymers of ethylenically unsaturated monomers which do not contain carboxyl or carboxyl-producing groups (i. e. anhydrides) can be utilized to produce cellular structures.

In place of the 2,4-toluenediisocyanate utilized above there can be substituted other diisocyanates such as phenylenediisocyanate; 2,6 - toluenediisocyanate; 1,5 - naphthalenediisocyanate; 1 - chloro - 1 - phenylene - 2,4 - diisocyanate; 4,4'-xenylenediisocyanate; tetramethylenediisocyanate and the like. The amount of these diisocyanates utilized is governed by the degree of cross-linking desired.

In general, desirable results are obtained when the diisocyanate is utilized in approximately 40 to 120 parts per 100 parts copolymer.

*Example X*

Ninety-eight parts 4-allylphenoxyacetic acid, 2 parts divinylbenzene and 0.5 percent benzoyl peroxide based on the monomers are dissolved in 1000 parts dry xylene and the polymerization carried out as in Example I. The insoluble, infusible polymer possesses ion-exchange properties. The product is comminuted and tested as described in Example XI.

*Example XI*

One hundred parts of the comminuted polymer of Example X are admixed with 1000 parts distilled water and 2000 parts standardized sodium hydroxide solution and the mixture agitated. After approximately one-half hour the resin is removed by filtration and the filtrate tested for the presence of sodium hydroxide by analytical titration. The efficiency of the resin as an ion-exchange body is determined by calculating the ratio of sodium ions actually removed from the solution to the ions theoretically removed. A good ion-exchange is indicated by calculations which show that approximately each of the calculated carboxyl groups of the copolymer removes a sodium ion from the solution.

It will be realized that the various cross-linked polymers of this invention possess ion-exchange properties, the degree varying with the number of carboxyl groups present in the polymer.

It will be realized that while the foregoing examples have been directed to certain allylphenoxyacetic acids, the invention is applicable broadly to allylaryloxyacetic acids of the formula.

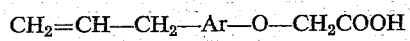

in which Ar is an arylene radical illustrated by such as, for example, phenylene, tolylene, naphthylene and the like.

While the invention has been described with reference to particular embodiments thereof, it will be understood that in its broadest aspects the invention may be variously embodied within the scope of the invention as set forth herein and in the appended claims.

What is claimed is:

1. A polymer of an allylaryloxyacetic acid having the formula:

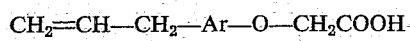

wherein Ar is an arylene radical.

2. A homopolymer of an allylaryloxyacetic acid of claim 1.

3. A homopolymer of 4-allylphenoxyacetic acid.

4. A homopolymer of 3-allylphenoxyacetic acid.

5. A copolymer of an allylaryloxyacetic acid having the formula:

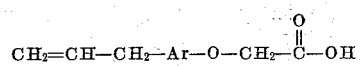

wherein Ar is an arylene radical, and at least one other copolymerizable ethylenically unsaturated monomer.

6. A copolymer of claim 5 wherein the copolymerizable ethylenically unsaturated monomer is selected from the group consisting of styrene, butadiene, acrylonitrile, maleic acid and methyl methacrylate.

7. An insoluble copolymer of claim 5, the acid groups of said copolymer being cross-linked with a material selected from the group consisting of an organic diisocyanate and a polyepoxy compound.

8. A foamed product of claim 7 wherein said copolymerizable unsaturated monomer is styrene and said material is an organic diisocyanate, the mole ratio of styrene to acid being from about 3:1 to 10:1 and the diisocyanate being present in an amount ranging from 40 to 120 parts per 100 parts copolymer.

References Cited in the file of this patent

UNITED STATES PATENTS

| | | |
|---|---|---|
| 2,343,547 | Gordon | Mar. 7, 1944 |
| 2,642,403 | Simon et al. | June 16, 1953 |
| 2,672,478 | Rust et al. | Mar. 16, 1954 |
| 2,740,743 | Pace | Apr. 3, 1956 |